United States Patent
Lewis et al.

(10) Patent No.: US 11,407,065 B2
(45) Date of Patent: *Aug. 9, 2022

(54) SYSTEMS AND METHODS FOR MANUFACTURING FILM COOLING HOLE DIFFUSER PORTION

(71) Applicant: Raytheon Technologies Corporation, Farmington, CT (US)

(72) Inventors: Scott D. Lewis, Vernon, CT (US); Stephen Lynch, State College, PA (US); Shane Haydt, State College, PA (US)

(73) Assignee: Raytheon Corporation Inc., Farmington, CT (US)

( * ) Notice: Subject to any disclaimer, the term of this patent is extended or adjusted under 35 U.S.C. 154(b) by 21 days.

This patent is subject to a terminal disclaimer.

(21) Appl. No.: 16/993,060

(22) Filed: Aug. 13, 2020

(65) Prior Publication Data
US 2020/0368851 A1 Nov. 26, 2020

Related U.S. Application Data

(63) Continuation of application No. 15/625,688, filed on Jun. 16, 2017, now Pat. No. 10,773,344.

(51) Int. Cl.
*B23K 26/00* (2014.01)
*B23K 26/384* (2014.01)
(Continued)

(52) U.S. Cl.
CPC ............ *B23K 26/384* (2015.10); *B23H 1/04* (2013.01); *B23H 7/24* (2013.01); *B23H 9/10* (2013.01);
(Continued)

(58) Field of Classification Search
CPC .......... B23K 26/384; B23H 7/24; B23H 9/14; B23H 9/10; B23H 1/04; F01D 25/12;
(Continued)

(56) References Cited

U.S. PATENT DOCUMENTS 4,650,949 A    3/1987 Field
4,738,588 A *  4/1988 Field ................... F01D 5/186
                                                  416/97 R
(Continued)

FOREIGN PATENT DOCUMENTS

EP    1502690    2/2005
EP    3179040    6/2017
WO    2016068860    5/2016

OTHER PUBLICATIONS

USPTO; U.S. Appl. No. 15/355,173, filed Nov. 18, 2016 entitled "Film Cooling Hole Including Offset Diffuser Portion Technical Field".
(Continued)

*Primary Examiner* — Phutthiwat Wongwian
*Assistant Examiner* — Sherman D Manley
(74) *Attorney, Agent, or Firm* — Snell & Wilmer L.L.P.

(57) ABSTRACT

A gas path component for a gas turbine engine includes a film cooling hole disposed in the gas path component. The film cooling hole includes a metering section, a diffuser, and a tapered surface extending between the metering section and the diffuser. The tapered surface is oriented between twenty degrees and seventy degrees with respect to a centerline axis of the metering section. The tapered surface is oriented at an obtuse angle with respect to an immediately adjacent surface of the diffuser, the obtuse angle is open towards the centerline axis. The tapered surface is configured to mitigate flow separation in the diffuser.

19 Claims, 8 Drawing Sheets

(51) Int. Cl.
*F01D 5/18* (2006.01)
*B23H 9/14* (2006.01)
*B23H 1/04* (2006.01)
*F23R 3/00* (2006.01)
*F01D 9/06* (2006.01)
*B23H 9/10* (2006.01)
*F23R 3/06* (2006.01)
*B23H 7/24* (2006.01)
*F01D 9/02* (2006.01)
*F01D 25/12* (2006.01)
*F02K 1/82* (2006.01)

(52) U.S. Cl.
CPC .............. *B23H 9/14* (2013.01); *F01D 5/186* (2013.01); *F01D 9/02* (2013.01); *F01D 9/065* (2013.01); *F01D 25/12* (2013.01); *F23R 3/002* (2013.01); *F23R 3/06* (2013.01); *F01D 9/023* (2013.01); *F02K 1/822* (2013.01); *F05D 2220/32* (2013.01); *F05D 2230/12* (2013.01); *F05D 2240/11* (2013.01); *F05D 2240/81* (2013.01); *F05D 2250/11* (2013.01); *F05D 2250/21* (2013.01); *F05D 2250/23* (2013.01); *F05D 2260/202* (2013.01); *F23R 2900/00018* (2013.01)

(58) Field of Classification Search
CPC . F01D 9/02; F01D 9/065; F01D 9/023; F01D 5/186; F05D 2220/32; F05D 2230/12; F05D 2260/202; F05D 2250/21; F05D 2250/23; F05D 2250/11; F05D 2240/81; F05D 2240/11; F23R 3/06; F23R 3/002
See application file for complete search history.

(56) References Cited

U.S. PATENT DOCUMENTS

| | | | | |
|---|---|---|---|---|
| 8,057,180 B1* | 11/2011 | Liang | ...................... | F01D 5/186 416/97 R |
| 8,066,484 B1* | 11/2011 | Liang | ...................... | F01D 5/186 416/97 R |
| 2004/0094524 A1* | 5/2004 | Stevens | ................ | B23K 26/384 219/121.71 |
| 2005/0023249 A1* | 2/2005 | Kildea | ..................... | B23H 9/10 219/69.17 |
| 2008/0031738 A1* | 2/2008 | Lee | ......................... | F01D 5/186 416/97 R |
| 2009/0255110 A1 | 10/2009 | Marszal et al. | | |
| 2012/0051941 A1* | 3/2012 | Bunker | .................. | F01D 5/186 416/97 R |
| 2013/0115103 A1* | 5/2013 | Dutta | ...................... | F01D 5/186 416/97 R |
| 2013/0205791 A1* | 8/2013 | Mongillo, Jr. | .......... | F01D 9/065 60/754 |
| 2013/0205792 A1* | 8/2013 | Gleiner | .................. | F23R 3/002 60/754 |
| 2013/0209233 A1* | 8/2013 | Xu | ......................... | F01D 5/186 415/116 |
| 2015/0152734 A1* | 6/2015 | Ceglio | .................... | F01D 5/186 416/97 R |
| 2015/0209883 A1 | 7/2015 | Hamada et al. | | |
| 2016/0076451 A1* | 3/2016 | McBrien | .................. | F02C 7/18 60/806 |
| 2016/0177737 A1* | 6/2016 | Musto | ..................... | F02K 1/822 415/115 |
| 2016/0201474 A1* | 7/2016 | Slavens | ................ | F04D 29/083 60/806 |
| 2016/0273364 A1* | 9/2016 | Bergholz | ................ | F01D 5/186 |
| 2016/0312619 A1* | 10/2016 | Thornton | ............... | F23R 3/002 |
| 2017/0081959 A1* | 3/2017 | Lewis | ....................... | F01D 9/02 |
| 2017/0335691 A1* | 11/2017 | Crites | .................... | F01D 9/023 |
| 2018/0230811 A1* | 8/2018 | Lewis | .................... | F01D 5/186 |
| 2018/0361512 A1* | 12/2018 | Lewis | .................... | F23R 3/002 |

OTHER PUBLICATIONS

USPTO, Requirement for Restriction dated Apr. 26, 2019 in U.S. Appl. No. 15/625,688.

USPTO, Non-Final Office Action dated Sep. 17, 2019 in U.S. Appl. No. 15/625,688.

USPTO, Final Office Action dated Feb. 6, 2020 in U.S. Appl. No. 15/625,688.

USPTO, Notice of Allowance dated May 15, 2020 in U.S. Appl. No. 15/625,688.

EPO, European Search Report dated Oct. 24, 2018 in Application No. 18177498.5.

* cited by examiner

SYSTEMS AND METHODS FOR MANUFACTURING FILM COOLING HOLE DIFFUSER PORTION

CROSS REFERENCE TO RELATED APPLICATIONS

This application is a continuation of, and claims priority to, and the benefit of U.S. patent application Ser. No. 15/625,688, filed on Jun. 16, 2017, and entitled "SYSTEMS AND METHODS FOR MANUFACTURING FILM COOLING HOLE DIFFUSER PORTION" which is incorporated by reference herein in its entirety.

FIELD

The present disclosure relates generally to film cooling holes, and more specifically to systems and methods for manufacturing film cooing holes for gas path components of a gas turbine engine.

BACKGROUND

Gas turbine engines include a compressor for compressing air, a combustor for mixing the compressed air with a fuel and igniting the mixture, and a turbine across which the resultant combustion products are expanded. As a result of the combustion, temperatures within the turbine engine gas path connecting each of the sections are extremely high. With some components the extreme temperatures require active cooling systems to keep the components exposed to the gaspath (referred to as gaspath components) below a maximum temperature and prevent damage to the component.

In some exemplary gaspath components, such as rotors and blades, among others, the active cooling takes the form of a film cooling process. In film cooling, a series of holes eject a stream of coolant, such as air, along a surface of the gaspath component being cooled. The stream of coolant simultaneously cools the exterior surface and provides a buffer zone to prevent at least a portion of the high temperature gasses in the gaspath from contacting the gaspath component. Film cooling can be utilized in conjunction with other active cooling systems, or on its own to cool a gaspath component depending on the needs of the gaspath component.

SUMMARY

A gas path component for a gas turbine engine is disclosed. The gas path component comprises a film cooling hole disposed in the gas path component. The film cooling hole comprises a metering section, a diffuser, and a tapered surface extending between the metering section and the diffuser, wherein the tapered surface is oriented between twenty degrees and seventy degrees with respect to a centerline axis of the metering section, and the tapered surface is oriented at an obtuse angle with respect to an immediately adjacent surface of the diffuser, the obtuse angle is open towards the centerline axis.

In various embodiments, the tapered surface is configured to mitigate flow separation in the diffuser.

In various embodiments, the diffuser is configured to receive cooling air from the metering section.

In various embodiments, the tapered surface is oriented between thirty degrees and sixty degrees with respect to the centerline axis of the metering section.

In various embodiments, the gas path component comprises a stator.

In various embodiments, the film cooling hole is located along a leading edge of the gas path component.

In various embodiments, the metering section is cylindrical.

In various embodiments, the diffuser comprises an inlet end and an outlet end, and the inlet end is narrower than the outlet end.

In various embodiments, the metering section comprises an exit, and the exit of the metering section intersects the inlet end of the diffuser.

In various embodiments, the tapered surface extends between the inlet end of the diffuser and the exit of the metering section.

In various embodiments, the diffuser intersects an exterior surface of the gas path component.

In various embodiments, the outlet end of the diffuser intersects an exterior surface of the gas path component.

In various embodiments, the gas path component further comprises a radially inward platform section, a radially outward platform section, and a vane portion extending between the radially outward platform section and the radially inward platform section, wherein the film cooling hole is disposed in the vane portion.

An electrode for electrical discharge machining a gas path component for a gas turbine engine is disclosed, comprising a diffuser portion, and a tapered portion defining a tip of the electrode. The tapered portion is configured to form a tapered surface extending between a metering section of the film cooling hole and a diffuser of the film cooling hole, wherein the tapered surface is oriented between twenty degrees and seventy degrees with respect to a centerline axis of the metering section, and the tapered surface is oriented at an obtuse angle with respect to an immediately adjacent surface of the diffuser, the obtuse angle is open towards the centerline axis In various embodiments, the tapered portion comprises a diameter D defined at an interface of the diffuser portion and the tapered portion, and a length L defined between the interface and a terminus of the electrode.

In various embodiments, the length L is between one fourth and two times the diameter D.

In various embodiments, the length L is between one half and one diameter D.

In various embodiments, the diffuser portion and the tapered portion extend along a centerline axis.

In various embodiments, the tapered portion is tapered along the centerline axis from the interface to the terminus.

In various embodiments, a geometry of the electrode is substantially equal to a geometry of a diffuser of a film cooling hole.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by refer

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure. A metering section and a diffuser of a film cooling hole are typically created using distinct machining actions. Since the metering section and the diffuser are machined via separate machining actions, it is possible to include an offset between the axis of the metering section and the centerline of the diffuser. The offset may be intentional or may be unintentional. The offset may cause the machining tool to create one or more sharp edges (e.g., an edge comprising a ninety degree angle), or abrupt steps, to be formed between the metering section and the diffuser. Such an abrupt geometry change of the film cooling hole may cause inefficiencies of the film cooling hole. Systems and methods are described herein for forming a diffuser while preventing sharp edges between the diffuser and the metering section in response to said offset.

Figure 1:
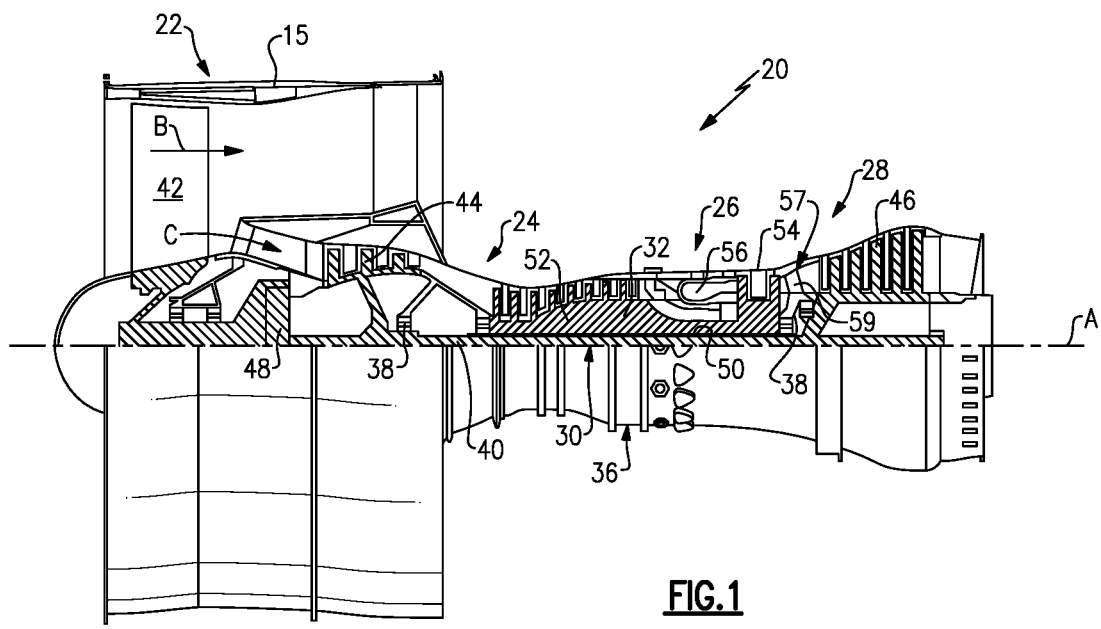
- FIG. 1 illustrates a schematic view of a gas turbine engine including multiple gaspath components, in accordance with various embodiments.

With reference to FIG. 1, a schematic view of a gas turbine engine 20 is illustrated, in accordance with various embodiments. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition— typically cruise at about 0.8 Mach and about 35,000 feet (10668 meters). The flight condition of 0.8 Mach and 35,000 ft (10668 m), with the engine at its best fuel consumption— also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/s).

In order to compensate for the extreme temperatures generated by the combustion, gaspath components, such as the blades and stators at an inlet of the turbine section 28 include active cooling systems. Among other cooling techniques the active cooling systems utilize a film cooling technique.

Figure 2:
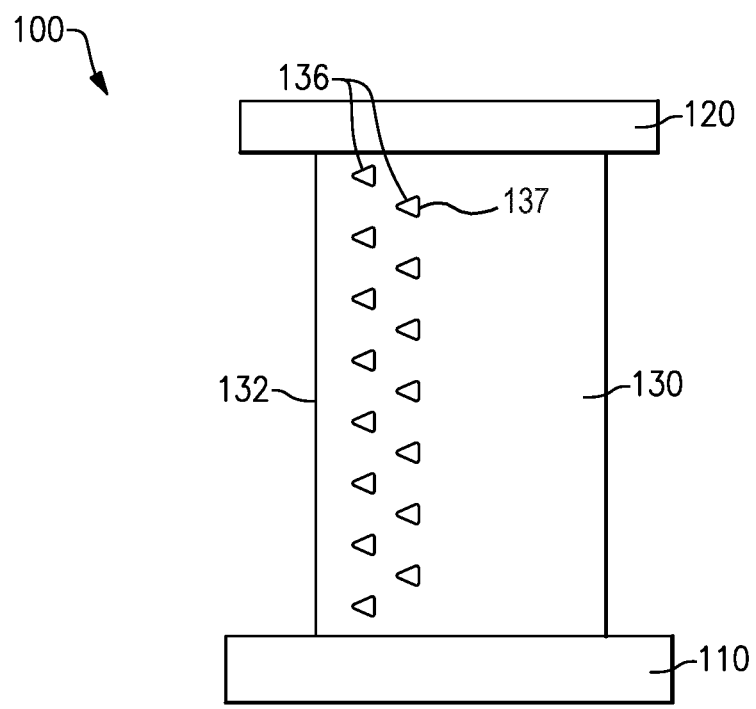
FIG. 2 illustrates a schematic view of an exemplary gaspath component including a series of film cooling holes, in accordance with various embodiments.

With continued reference to FIG. 1, FIG. 2 illustrates an exemplary film cooled gaspath component 100. The exemplary film cooled gaspath component 100 is a stator, however one of skill in the art having the benefit of this disclosure will understand that the shaped film cooling holes described herein can be utilized in any type of film cooled component, and are not limited to stators.

The film cooled component 100 includes a radially inward platform section 110, a radially outward platform section 120, and a vane portion 130 extending between radially inward platform section 110 and radially outward platform section 120. The vane portion 130 may include a leading edge 132 positioned at a fore most edge of the vane portion 130, relative to an expected direction of fluid flow through the engine. Similarly, the vane portion 130 may include a trailing edge 134 positioned at an aft most edge of the vane portion 130, relative to an expected direction of fluid flow through the engine.

In various embodiments, multiple rows of film cooling holes 136 may be located along leading edge 132. Film cooling holes 136 may be connected to an internal plenum that receives a cooling fluid from either the radially outward platform section 120 or the radially inward platform section 110. The cooling fluid is pressurized and is forced out of the film cooling hole along the surface of the vane portion 130. As described herein, the portion of the film cooling hole 136 which intersects the surface of the vane portion 130 may comprise a diffuser 137. A metering section of the film cooling hole may be located inward from the diffuser 137. The cooling fluid may form a layer of fluid, or a film, that adheres to the vane portion 130 and simultaneous cools the vane portion 130 and provides a buffer against hot gasses within the gaspath contacting the vane portion 130.

Figure 3:
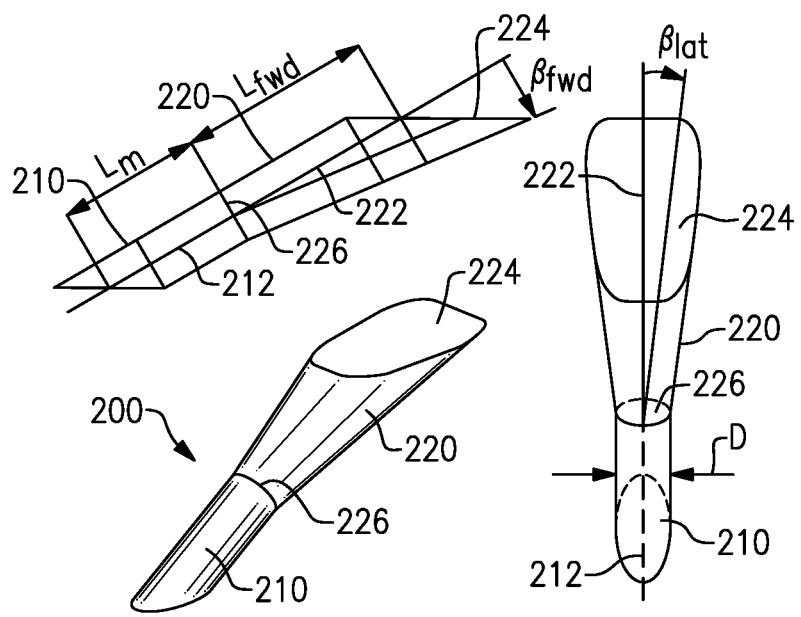
FIG. 3 schematically illustrates a negative space of one exemplary film cooling hole, in accordance with various embodiments.

With continued reference to FIG. 1 and FIG. 2, FIG. 3 schematically illustrates a negative space of one exemplary film cooling hole 200. The term "negative space" refers to the volume bounded by the material, for example of film cooled component 100 (see FIG. 2), surrounding film cooling hole 200. In this regard, one or more film cooling holes 136 of FIG. 2 may be similar to film cooling hole 200. The film cooling hole 200 is a shaped film cooling hole. Shaped film cooling holes generally consist of a metering section 210 through the material of the gaspath component and a diffuser 220 to spread coolant over the surface of the gaspath component. In order to spread the coolant the diffuser 220 is angled outward from the metering section 210, and expands the coolant. In various embodiments, the diffuser 220 is angled between 5 and 15 degrees in the forward and both lateral directions. The intentional offset between the diffuser 220 and the metering section 210 is applicable to these diffused holes angled between 5 to 15 degrees, as well as any number of other film cooling hole styles, as will be understood by one of skill in the art.

The metering section 210 and the diffuser 220 are typically created using distinct machining actions. The metering section 210 may be located inward from the diffuser. Stated differently, the diffuser 220 may receive cooling fluid from the metering section 210. In various embodiments, the holes are created using electrical discharge machining (EDM), although any alternative machining process can be used to similar effect. Film cooling holes may be designed such that a centerline 222 of the diffuser 220, and an axis 212 of the metering section 210 are collinear. The centerline 222 of the diffuser 220 is defined as a line drawn from a midpoint of the opening intersecting with the metering section 210 to a midpoint of the opening in the exterior of the gas-path component 100 (see FIG. 2).

In the illustrated embodiment, the metering section 210 is generally cylindrical with a circular cross section parallel to an axis 212 defined by the cylinder. In various embodiments, the metering section 210 can be formed with alternative cross sectional shapes, such as regular polygons, and function in a similar manner. The metering section 210 may provide a through hole to the pressurized internal cavity and may allow cooling fluid to be passed from the internal cavity to an exterior surface of the gas path component 100. In various embodiments, the pressurized internal cavity may be an impingement cavity, wherein a cooling fluid impinges on a surface of the cavity.

The diffuser 220 may be an angled hole with a wider opening 224 at an outlet end on the surface of the gas path component and a narrower opening 226, approximately the same size as the metering section 210 cross section interior to the gas path component. By aligning the axis 212 of the metering section 210 with a centerline 222 of the diffuser 220, the diffuser 220 is able to expand and direct the cooling gas emitted from the metering section 210 and thereby enhance the film cooling layer.

Figure 4:
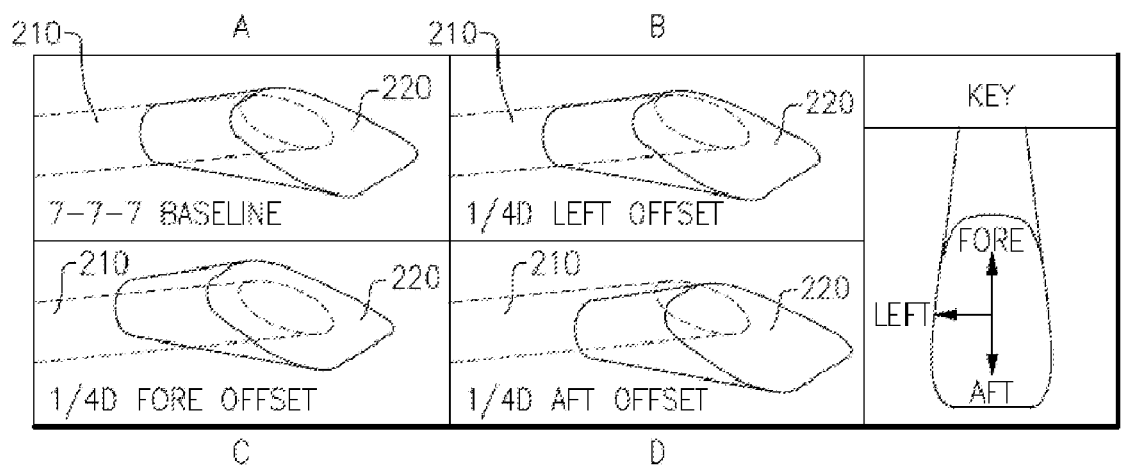
FIG. 4 schematically illustrates multiple arrangements of the negative space illustrated in FIG. 3, in accordance with various embodiments.
Figure 5:
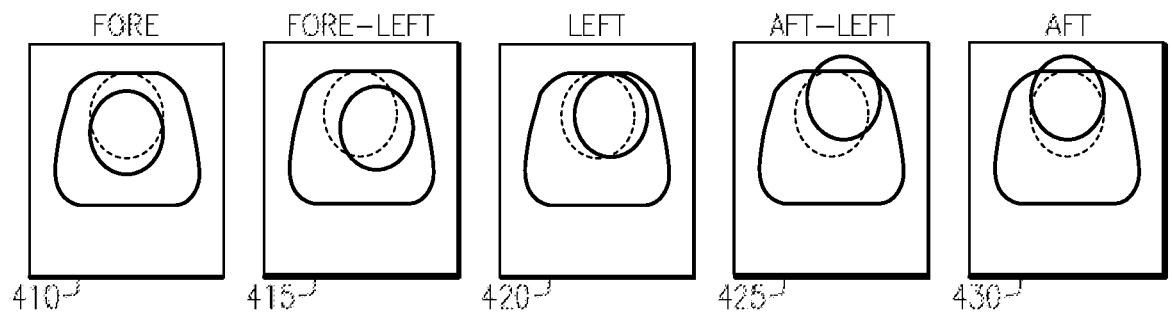
FIG. 5 schematically illustrates a surface view of multiple specific arrangements of a film cooling hole, in accordance with various embodiments.

Since the metering section 210 and the diffuser 220 are machined into the gas path component via separate machining actions, it is possible to include an offset between the axis 212 of the metering section 210 and the centerline 222 of the diffuser 220. The offset may be intentional or may be unintentional. With continued reference to FIG. 3, and with like numerals indicating like elements, FIG. 4 and FIG. 5 schematically illustrate various offsets, in accordance with various embodiments. Included in the illustration of FIG. 5 is a key illustrating the terms "fore", "aft", and "left" as they are applied to a given film cooling hole 200. Illustration A shows a film cooling hole 200 where the diffuser 220 and the metering section 210 are not offset. Illustration B shows a diffuser 220 that is offset left by one quarter of the diameter of the circular cross section of the metering section 210. Illustration C shows a diffuser 220 that is offset forward by one quarter of the diameter of the circular cross section of the metering section 210. Illustration D shows a diffuser 220 that is offset aftward by one quarter of the diameter of the metering section 210. In various embodiments, the offset may result in the centerline 222 and the axis 212 being parallel, but not collinear. In other embodiments, the offset may include a rotation of the diffuser 220, and the centerline 222 and the axis 212 can be skew. While referred to herein by their relationship to the diameter of the circular cross section of the film cooling hole, one of skill in the art will understand that in the alternative examples using differently shaped metering sections, the diameter referred to is a hydraulic diameter.

Figure 11:
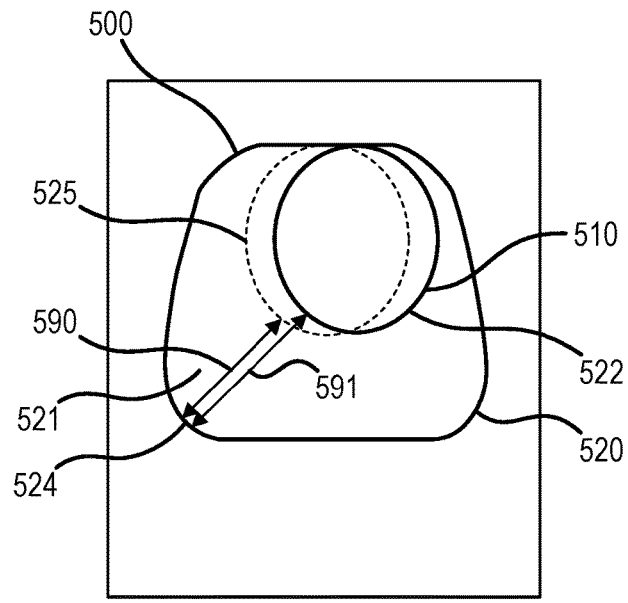
FIG. 11 illustrates a film cooling hole with a metering section offset from a nominal hole position of the diffuser, in accordance with various embodiments.

In a similar vein, FIG. 5 illustrates views of five different offsets at the surface of the gaspath component, with view 410 corresponding to illustration C of FIG. 4, view 420 corresponding to illustration B of FIG. 4, and 430 corresponding to illustration D of FIG. 4. It is also recognized that any of the offsets described above can be combined with another offset. By way of example, view 415 is a combination of the offsets of views 410 and 420, alternately referred to as a fore-left offset. In another example, view 425 is a combination of views 420 and 430, alternately referred to as an aft-left offset. When including an offset, whether intentionally or unintentionally, the diffuser 220 may not be aligned with the cross section of the metering section 210. With momentary reference to FIG. 11, a film cooling hole 500 is illustrated with a metering section 510 intersecting the diffuser 520 at a location which is offset from a nominal hole position 525. As a result of the metering section 510 not aligning with the nominal hole position 525, the flow of coolant through the metering section 510 entering into the diffuser 520 may separate from the internal surface 521 of the diffuser 520. Flow separation may result in detriments to the film cooling effectiveness of film cooling hole 500. In this case, the distance between diffuser inlet 522 and the furthest edge 524 at the outlet of the diffuser is increased. FIG. 11 illustrates distance 591 being greater than distance 590. In addition, misalignment may cause a sharp edge to be formed between the metering section and the diffuser.

Further, while illustrated in accordance with various embodiments as 90 degree increments for the offsets, one of skill in the art will understand that an offset can be made according to any known increment and achieve a desired purpose, with the magnitude of the offset and the angle of the offset being determined by the specific needs of the given application.

Offsetting the diffuser 220 from the metering section 210 affects the disbursement of the cooling fluid along the surface of the gas path component including the film cooling hole 200, and has a corresponding effect on the efficacy of the film cooling.

In various embodiments, such as the illustrated aft shifts of FIG. 4 and FIG. 5, ideal cooling is achieved by shifting the diffuser 220 upstream relative to an expected fluid flow through the gas path of the turbine engine in which the gas path component is located. Shifting the diffuser 220 upstream increases the cooling capabilities of the film cooling system. In yet further embodiments, the diffuser 220 is shifted upstream by one quarter (25%) of the diameter of the metering section 210. In further embodiments, ideal cooling is achieved by shifting the diffuser 220 upstream by one eighth (12.5%) of the diameter of the metering section 210. In other embodiments, the diffuser 220 is shifted by an amount within the range of one eight to one quarter of the diameter of the metering section 210. In further alternative embodiments, the diffuser 220 can be shifted upstream by any suitable amount, and the shifting is not limited to the range of one eight to one quarter of the diameter of the metering section 210.

Another factor that impacts the effectiveness of the cooling provided by any given film cooling hole is the blowing ratio of the cooling hole. The blowing ratio is a number determined by $\rho c U c / \rho \infty U \infty$, where $\rho c$ is the density of the cooling fluid, $U c$ is the velocity of the cooling fluid passing through the coolant hole, $\rho \infty$ is the density of the fluid in the gaspath, and $U \infty$ is the velocity of the fluid in the gaspath. In some examples, the film cooling provided is most effective when the blowing ratio is 1.0, with the cooling effectiveness decreasing the farther the film gest from the originating film cooling hole.

As previously mentioned, metering section 210 and the diffuser 220 are typically created using distinct machining actions. In various embodiments, when the holes are created using an EDM process, an electrode may be used to remove material from the gaspath component to form the shaped cooling hole.

Figure 6A:
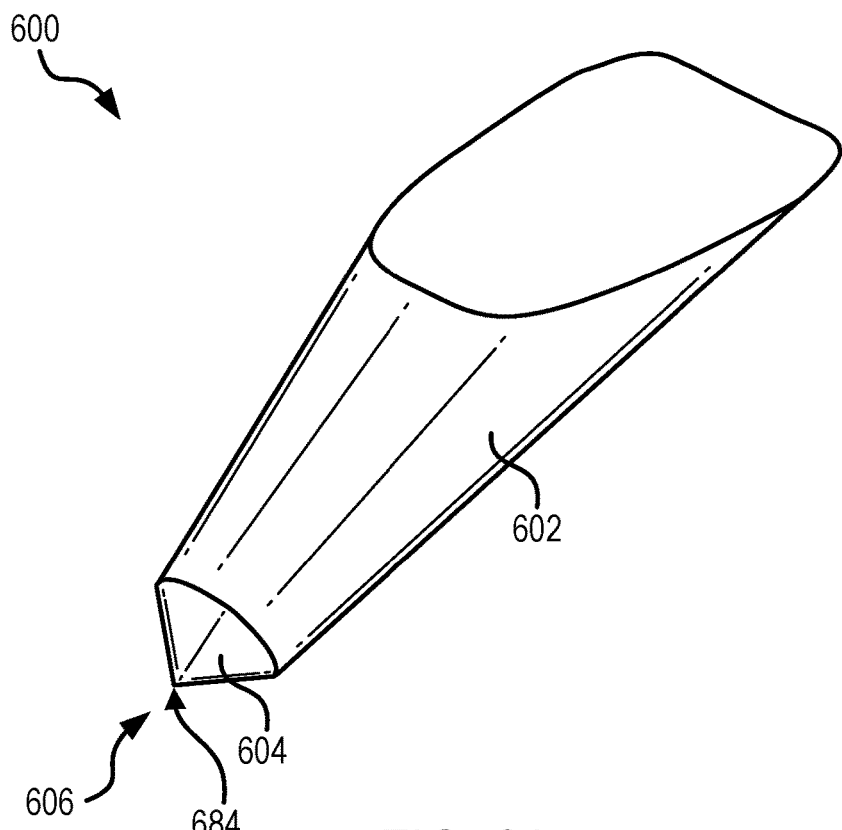
FIG. 6A and FIG. 6B illustrate an isometric view and a side view, respectively, of an electric discharge machining (EDM) electrode, in accordance with various embodiments.
Figure 6B:
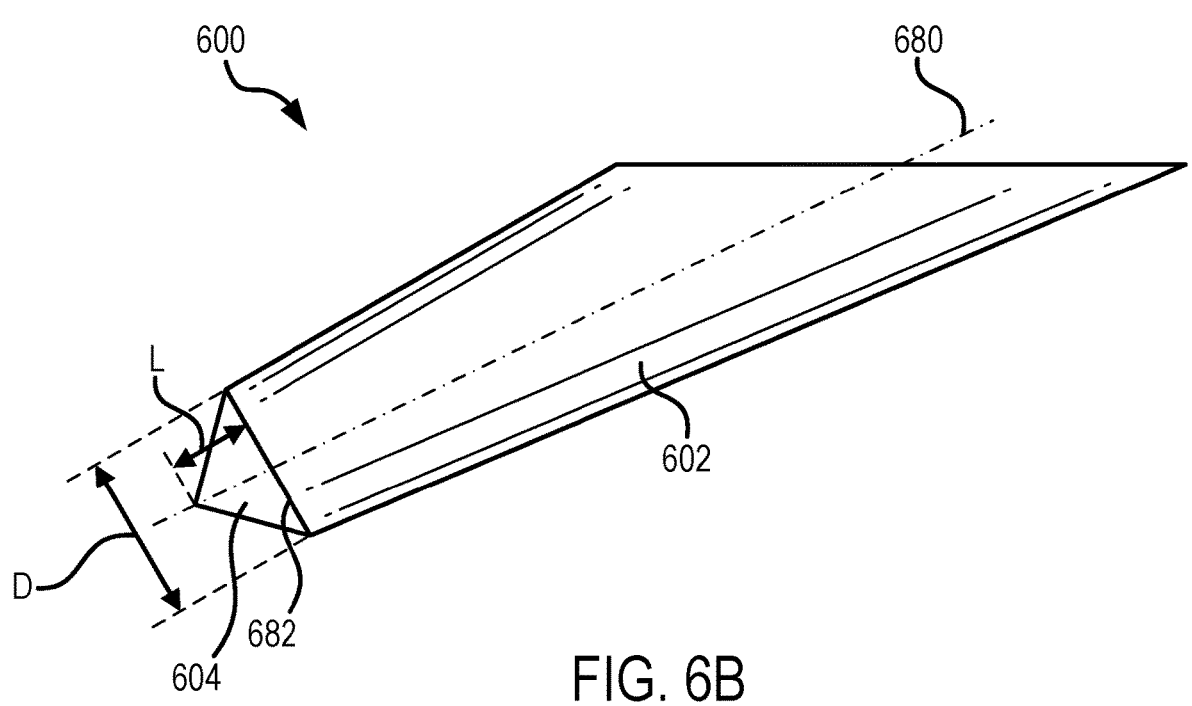

With reference to FIG. 6A and FIG. 6B, an electrode 600 is illustrated, in accordance with various embodiments. Electrode 600 may comprise copper or other electrical conductive material. Electrode 600 may comprise a diffuser portion 602. Diffuser portion 602 may extend along a centerline axis 680. The geometry of the diffuser portion 602 may be complementary to the geometry of diffuser 220, with momentary reference to FIG. 3. Electrode 600 may comprise a tapered portion 604 extending from the diffuser portion 602. Tapered portion 604 may define the tip 606 of electrode 600. Tapered portion 604 may be seamlessly coupled to diffuser portion 602. In various embodiments, tapered portion 604 and diffuser portion 602 may be monolithically coupled.

Tapered portion 604 may comprise a length L. Length L may be measured from the interface 682 of tapered portion 604 and diffuser portion 602 and the terminus 684 of the electrode 600. Tapered portion may comprise a diameter D. Diameter D may be defined at interface 682. In various embodiments, Length L may be between one-fourth of the diameter D and two times the diameter D (between ¼ D and 2 D), and in various embodiments, between one-half of the diameter D and one and one fourth of the diameter D (between ½ D and 1¼ D), and in various embodiments, between one-half of the diameter D and one diameter D (between ½ D and 1 D).

Figures 12A, 12B, 12C, 12D:
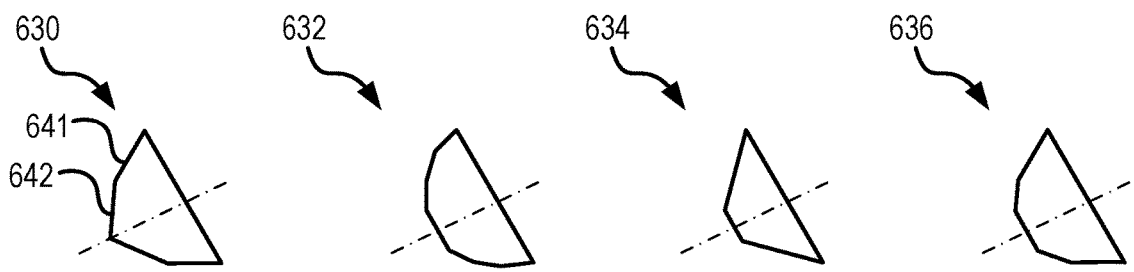
FIG. 12A through FIG. 12E illustrate cross-sectional views of various tapered portions of an EDM electrode having various geometries, in accordance with various embodiments.
Figure 12E:
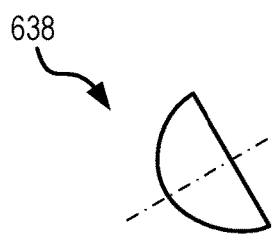

With additional reference to FIG. 12A through FIG. 12E, the tapered portion 604 may comprise various geometries, in accordance with various embodiments. For example, tapered portion 604 may be conical, as illustrated in FIG. 6B for example. FIG. 12A illustrates tapered portion 630 comprising a frustoconical portion having a surface 641 at a first angle with respect to the centerline axis of tapered portion 630 and a conical portion having a surface 642 at a second angle with respect to the centerline axis of tapered portion 630. FIG. 12B illustrates tapered portion 632 having a polygonal geometry and having a blunt tip. FIG. 12C illustrates tapered portion 634 having a frustoconical geometry. FIG. 12D illustrates tapered portion 636 having a polygonal geometry. FIG. 12E illustrates tapered portion 638 having a rounded geometry. Tapered surface 792 may be oriented at an obtuse angle α with respect to an immediately adjacent surface 722 of diffuser 720. The obtuse angle α may be open towards centerline axis 791.

Figure 7A:
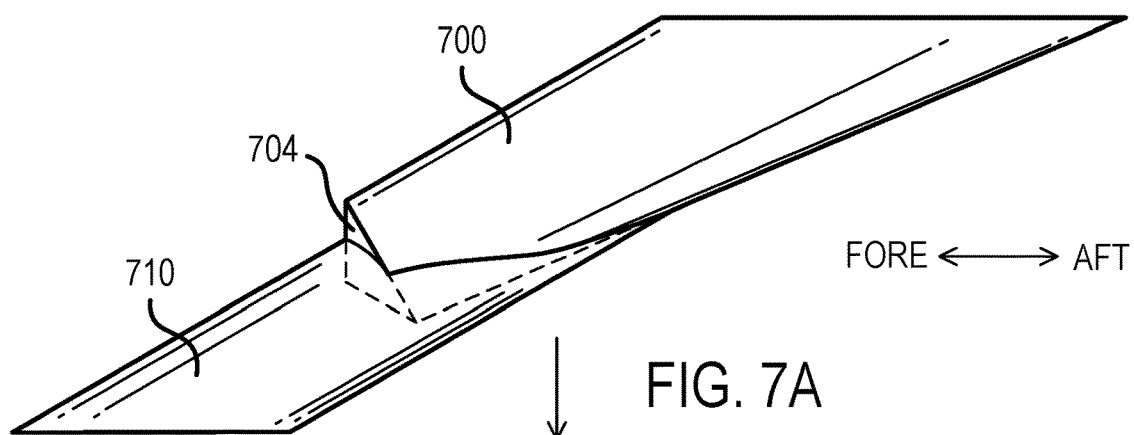
FIG. 7A illustrates a side view of an EDM electrode machining a diffuser of a film cooling hole, in accordance with various embodiments.
Figure 7B:
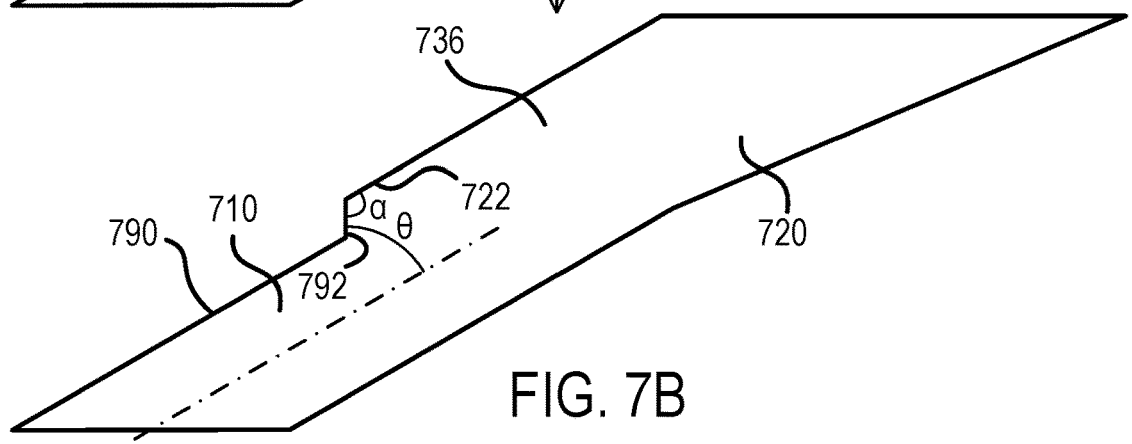
FIG. 7B illustrates a side view of the film cooling hole formed by the EDM electrode of FIG. 7A, in accordance with various embodiments.

With reference to FIG. 7A, an electrode 700 is illustrated machining the negative space of a metering section 710 for clarity purposes. In the illustrated embodiment, the tapered portion 704 of electrode 700 comprises a length L of ¼ D (see FIG. 6B). Metering section 710 may be similar to metering section 210, with momentary reference to FIG. 3. In the illustrated embodiment, the centerline of electrode 700 is offset in the fore direction with respect to the centerline of the metering section 710. FIG. 7B illustrates a profile 790 of the film cooling hole 736 as a result of the machining process illustrated in FIG. 7A. Film cooling hole 736 may comprise metering section 710 and diffuser 720. Diffuser 720 may be similar to diffuser 220, with momentary reference to FIG. 2. As a result of the tapered portion 704 of electrode 700, a tapered surface 792 may be formed between metering section 710 and diffuser 720 of film cooling hole 736. Tapered surface may extend between the exit of metering section 710 and the inlet of diffuser 720. Tapered surface 792 may mitigate detrimental effects due to meter/diffuser offset, such as undesired reductions in film effectiveness for example. Tapered surface 792 may mitigate flow separation in diffuser 720. In various embodiments, tapered surface 792 may be oriented at an angle of between twenty degrees and seventy degrees with respect to centerline axis 791 of metering section 710, and in various embodiments, at an angle of between thirty degrees and sixty degrees with respect to centerline axis 791 of metering section 710.

Figure 8A:
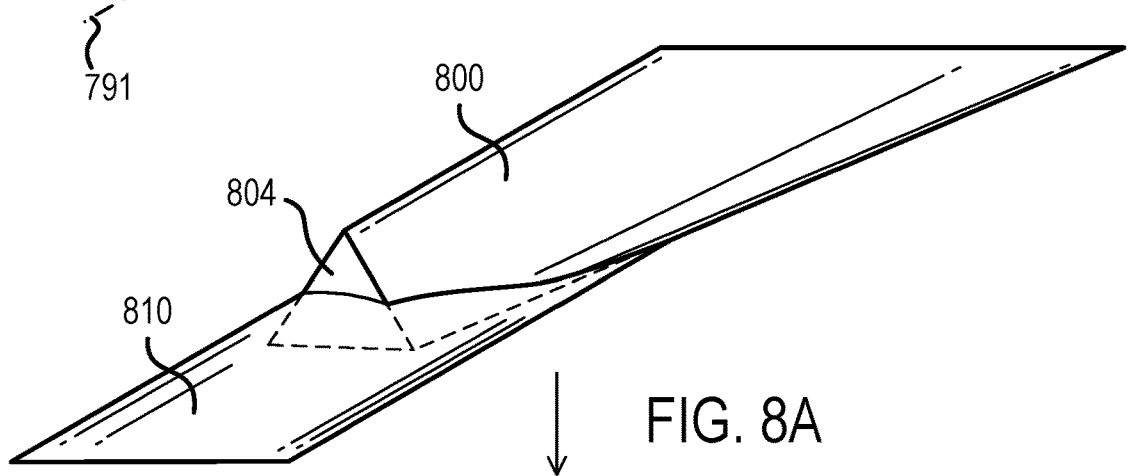
FIG. 8A illustrates a side view of an EDM electrode machining a diffuser of a film cooling hole, in accordance with various embodiments.
Figure 8B:
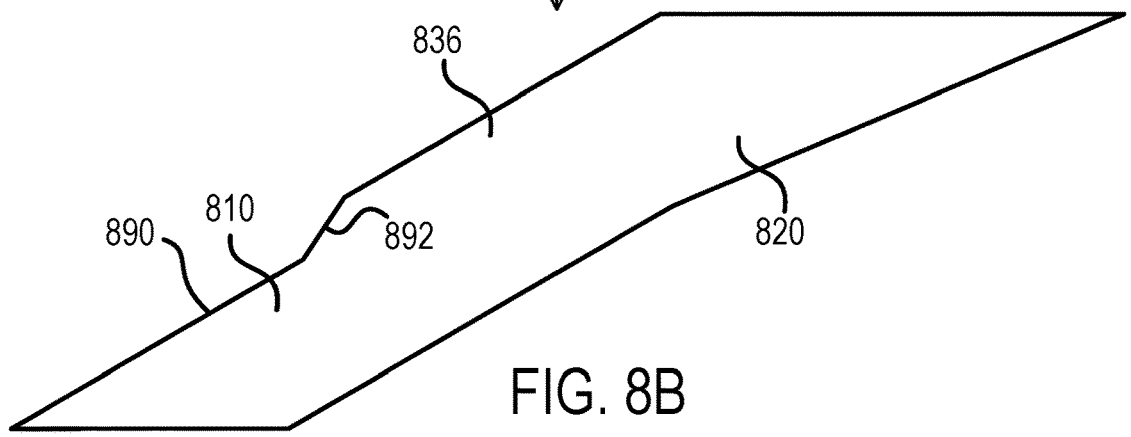
FIG. 8B illustrates a side view of the film cooling hole formed by the EDM electrode of FIG. 7A, in accordance with various embodiments.

With reference to FIG. 8A, an electrode 800 is illustrated machining the negative space of a metering section 810, for clarity purposes. In the illustrated embodiment, the tapered portion 804 of electrode 800 comprises a length L equal to diameter D (see FIG. 6B). Metering section 810 may be similar to metering section 210, with momentary reference to FIG. 3. In the illustrated embodiment, the centerline of electrode 800 is offset in the fore direction with respect to the centerline of the metering section 810. FIG. 8B illustrates a profile 890 of the film cooling hole 836 as a result of the machining process illustrated in FIG. 8A. Film cooling hole 836 may comprise metering section 810 and diffuser 820. Diffuser 820 may be similar to diffuser 220, with momentary reference to FIG. 2. As a result of the tapered portion 804 of electrode 800, a tapered surface 892 may be formed between metering section 810 and diffuser 820 of film cooling hole 836. Tapered surface 892 may mitigate detrimental effects due to meter/diffuser offset, such as film effectiveness for example. For example, tapered surface 892 may mitigate flow separation in diffuser 820.

Figure 9A:
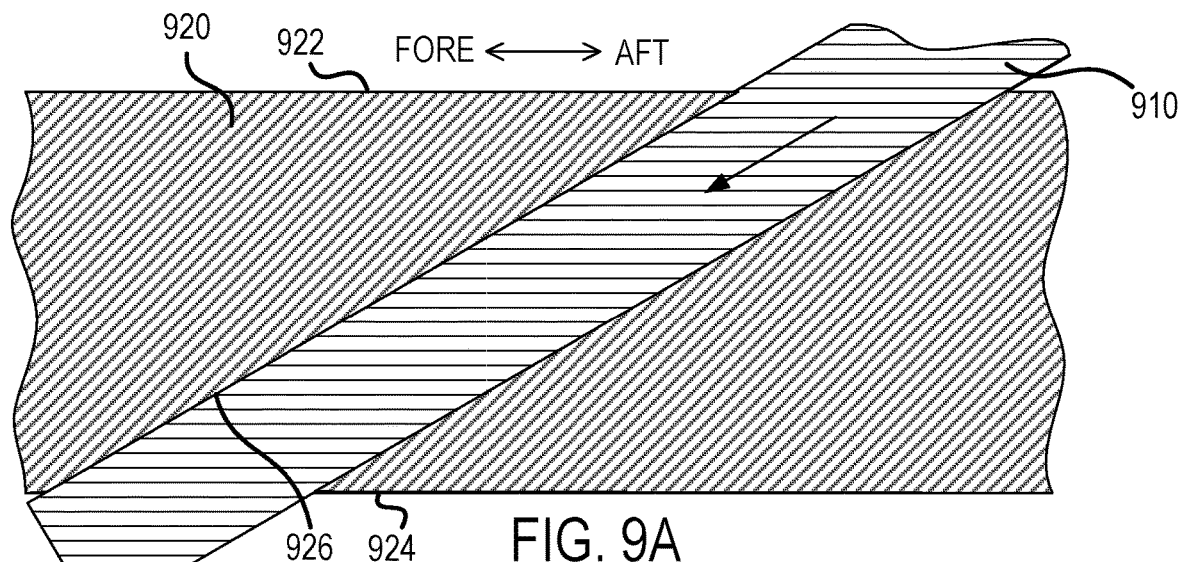
FIG. 9A illustrates a partial cross-section view of a tool forming a metering section of a film cooling hole, in accordance with various embodiments.
Figure 9B:
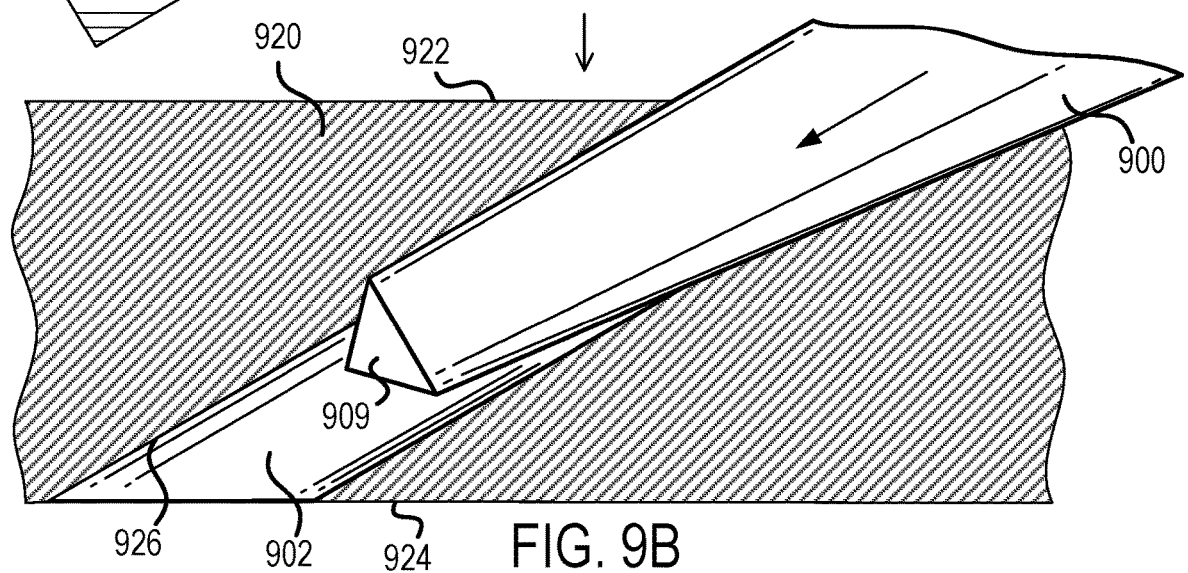
FIG. 9B illustrates a partial cross-section view of a tool forming a diffuser of a film cooling hole, in accordance with various embodiments.
Figure 9C:
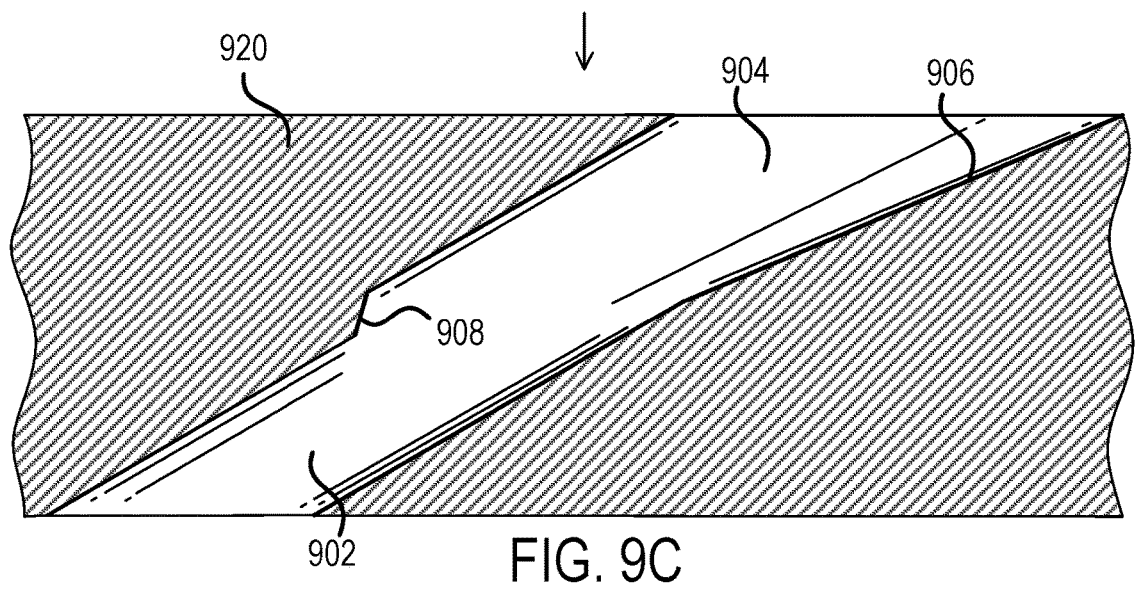
FIG. 9C illustrates a cross-section view of the film cooling hole formed in FIG. 9A and FIG. 9B, in accordance with various embodiments.

With reference to FIG. 9A through FIG. 9C, a method for machining a film cooling hole into a film cooled gaspath component 920 is illustrated, in accordance with various embodiments. With combined reference to FIG. 9A and FIG. 10, a method 950 for forming a film cooling hole is illustrated, in accordance with various embodiments. Method 950 includes forming a metering section in a film cooled gaspath component (step 952). Step 952 may include moving a tool 910 through the film cooled gaspath component 920. For example, the tool 910 may be moved from an outer surface 922 of the film cooled gaspath component 920 to an inner surface 924 of the film cooled gaspath component 920 to form a hole 926 extending from the outer surface 922 to the inner surface 924. In various embodiments, instead of the tool 910 forming a hole 926 extending from the outer surface 922 to the inner surface 924, the tool may form a hole 926 extending from the inner surface 924 to a location between the outer surface 922 and the inner surface 924. Stated differently, the tool 910 may form a hole 926 that only partially extends into film cooled gaspath component 920 from inner surface 924. The tool 910 may be removed from hole 926.

In various embodiments, tool 910 may comprise a drill, an electrode, a laser drill (e.g., a laser beam), or any other tool suitable for removing material from film cooled gaspath component 920 to form a metering section 902 (see FIG. 9B). In various embodiments, tool 910 may comprise a constant diameter along an axial length of the tool 910.

Figure 10:
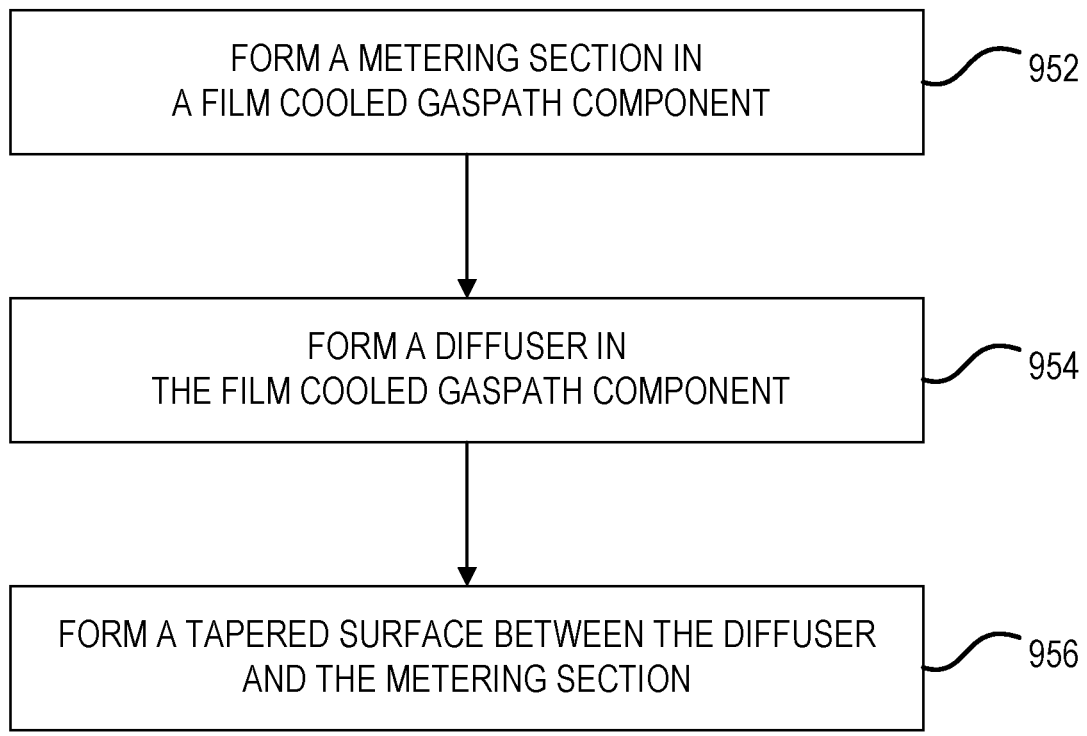
FIG. 10 illustrates a method for forming a film cooling hole, in accordance with various embodiments.

With combined reference to FIG. 9B and FIG. 10, method 950 includes forming a diffuser in the film cooled gaspath component (step 954). Step 954 may include inserting a tool 900 at least partially into film cooled gaspath component 920. Tool 900 may be introduced to film cooled gaspath component 920 at outer surface 922. Tool 900 may be moved towards inner surface 924 such that tool 900 forms a diffuser 904 (see FIG. 9C). Tool 900 may be similar to electrode 600, with momentary reference to FIG. 6B.

With combined reference to FIG. 9B, FIG. 9C, and FIG. 10, method 950 includes forming a tapered surface 908 between the diffuser and the metering section (step 956). In the illustrated embodiment, tool 900 comprises a tapered end 909. In this regard, the tool path of tool 900 comprises tapered end 909. The tool 900 may be translated along the axially direction of the tool without moving perpendicular to the axial direction since the geometry of tool 900 defines the negative space of the diffuser 904. In various embodiments, a tool may be used which comprises an end having a dimension which is less than the size of tapered end 909. In this regard, the tool may be moved, such that the tool path forms tapered end 909. Stated differently the tool may be moved within a path which is defined by the bounds of tapered end 909.

With combined reference to FIGS. 9A through 9C, tool 910 may form metering section 902, tool 900 may form diffuser 904, and diffuser 904 and metering section 902 may collectively form film cooling hole 906. A cooling flow may flow from metering section 902 to diffuser 904 to provide film cooling to outer surface 922.

Benefits, other advantages, and solutions to problems have been described herein with regard to specific embodiments. Furthermore, the connecting lines shown in the various FIGS. contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas path component for a gas turbine engine, comprising:
   a film cooling hole disposed in the gas path component, the film cooling hole comprising:
   a metering section;
   a diffuser; and
   a tapered surface extending between the metering section and the diffuser;
   wherein the tapered surface is configured to mitigate flow separation in the diffuser,
   the tapered surface is oriented between twenty degrees and seventy degrees with respect to a centerline axis of the metering section, and
   the tapered surface is oriented at an obtuse angle with respect to an immediately adjacent surface of the diffuser, the obtuse angle is open towards the centerline axis.

2. The gas path component of claim 1, wherein the diffuser is configured to receive cooling air from the metering section.

3. The gas path component of claim 2, wherein the tapered surface is oriented between thirty degrees and sixty degrees with respect to the centerline axis of the metering section.

4. The gas path component of claim 2, wherein the gas path component comprises a stator.

5. The gas path component of claim 4, wherein the film cooling hole is located along a leading edge of the gas path component.

6. The gas path component of claim 1, wherein the metering section is cylindrical.

7. The gas path component of claim 1, wherein the diffuser comprises an inlet end and an outlet end, and the inlet end is narrower than the outlet end.

8. The gas path component of claim 7, wherein the metering section comprises an exit, and the exit of the metering section intersects the inlet end of the diffuser.

9. The gas path component of claim 8, wherein the tapered surface extends between the inlet end of the diffuser and the exit of the metering section.

10. The gas path component of claim 1, wherein the diffuser intersects an exterior surface of the gas path component.

11. The gas path component of claim 7, wherein the outlet end of the diffuser intersects an exterior surface of the gas path component.

12. The gas path component of claim 1, further comprising:
    a radially inward platform section;
    a radially outward platform section; and
    a vane portion extending between the radially outward platform section and the radially inward platform section,
    wherein the film cooling hole is disposed in the vane portion.

13. An electrode for electrical discharge machining a film cooling hole in a gas path component for a gas turbine engine, comprising:
    a diffuser portion; and
    a tapered portion defining a tip of the electrode;
    wherein the tapered portion is configured to form a tapered surface within the film cooling hole, the tapered surface extending between a metering section of the film cooling hole and a diffuser of the film cooling hole;
    wherein the tapered surface is oriented between twenty degrees and seventy degrees with respect to a centerline axis of the metering section; and
    the tapered surface is oriented at an obtuse angle with respect to an immediately adjacent surface of the diffuser, the obtuse angle is open towards the centerline axis.

14. The electrode of claim 13, wherein the tapered portion comprises a diameter D defined at an interface of the diffuser portion and the tapered portion, and a length L defined between the interface and a terminus of the electrode.

15. The electrode of claim 14, wherein the length L is between one fourth and two times the diameter D.

16. The electrode of claim 15, wherein the length L is between one half and one diameter D.

17. The electrode of claim 14, wherein the diffuser portion and the tapered portion extend along a centerline axis.

18. The electrode of claim 17, wherein the tapered portion is tapered along the centerline axis from the interface to the terminus.

19. The electrode of claim 13, wherein a geometry of the electrode is substantially equal to a geometry of a diffuser of a film cooling hole.

* * * * *